Nov. 17, 1953     A. G. LEICHT     2,659,106
METHOD OF MAKING DENTURES
Filed Feb. 8, 1950
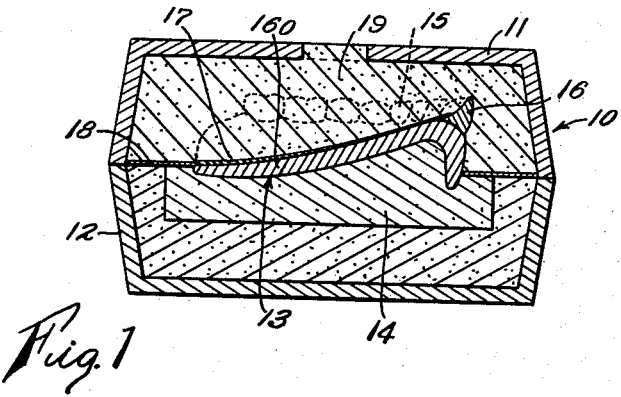
Fig. 1
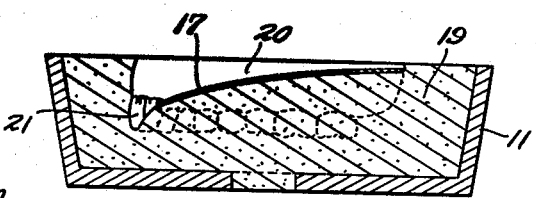
Fig. 2
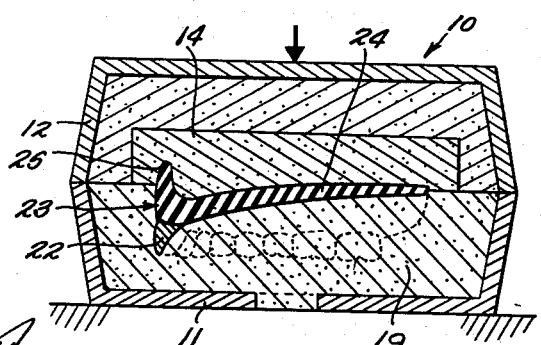
Fig. 3
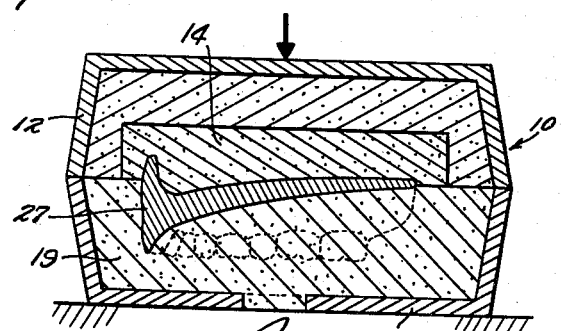
Fig. 5
Fig. 4
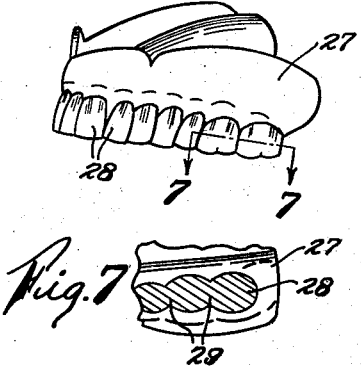
Fig. 6
Fig. 7
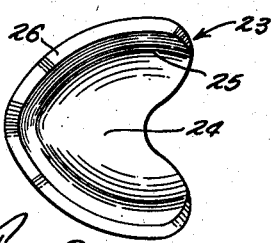
Fig. 8
INVENTOR.
Albert G. Leicht
BY
Murray, Sachhoff, Murray
ATT'YS Patented Nov. 17, 1953

2,659,106

UNITED STATES PATENT OFFICE 2,659,106

METHOD OF MAKING DENTURES

Albert G. Leicht, Cincinnati, Ohio

Application February 8, 1950, Serial No. 143,046

4 Claims. (Cl. 18—55.1)

This invention relates to the manufacture of artificial dentures, and is particularly directed to a technique for making one-piece, molded plastic dental plates.

An object of the invention is to provide an artificial one-piece denture which has a clean-cut line of demarcation between the white teeth and the pink colored gum portions thereof and which is re-enforced against accidental breakage due to the fact that the teeth and gum portions are integrally united during the curing operation and adjacent teeth are united to each other and the gum portions by wide webs that are also united to the gum portion of the denture.

Another object of the present invention is to provide a sanitary, molded pastic dental plate which is free of all cavities or recesses in which food might lodge.

A further object of this invention is to provide an improved process for manufacturing a dental appliance having the foregoing characteristics.

According to this invention, the final teeth for the denture are first molded, partially cured and formed and then the uncured dental base and partially cured teeth are united by completely curing both of them in a flask by application of heat and pressure. The steps in the process of forming the teeth in partially cured condition is of the greatest importance in that the partially cured plastic may be trimmed, cut and worked to get an accurate replica of the teeth whilst the uniting and curing of the partially cured teeth and uncured plastic gum material permits the gum material to flow around the accurately formed bases of the teeth whilst preventing displacement of the teeth material by the gum material during final curing because of the greater set and hardness of the teeth.

A still further object of this invention is to provide a novel appliance for carrying out my process in the standard two-part, dental flask.

With the above important and other secondary objects in view, as will be apparent from the following specification, the invention consists of the features of construction, the parts and combinations thereof, and the mode of operation, set forth hereinafter and particularly identified in the appended claims.

In the drawing which illustrates a preferred embodiment of this invention:

Fig. 1 is a sectional view through the conventional two-part dental flask showing the wax trial plate invested in one of the parts.

Fig. 2 is a section through a part of the dental flask, with the wax trial plate and its proper teeth removed from the investment material therein.

Fig. 3 is a sectional view of the assembled flask during the process of shaping the teeth material.

Fig. 4 is a perspective view of the partially cured teeth for the completed denture.

Fig. 5 is a sectional view of the assembled flask for the final curing step for the denture.

Fig. 6 is a perspective view of the complete denture formed by my process.

Fig. 7 is a section taken on line 7—7 of Fig. 6.

Fig. 8 is a top plan view of the resilient follower for my method.

With reference to the drawing the numeral 10 generally indicates a separable two-part dental flask of the usual type comprising sections 11 and 12 each having interfitting guide elements (not shown) for directing the parts into the cooperating relationship shown in Figs. 1, 3 and 5. In Fig. 1 there is illustrated a trial plate 13 given a contour which is to be duplicated in the finished dental appliance. This trial plate is usually set upon a model or stone 14 invested in the investment material in the flask part 12, the outer, trial plate engaging surface of the stone having the exact form of the gums for the wearer of the dental appliance. The trial plate has a base 15 made of wax, or the like, which has the proper number of artificial teeth 16 attached thereto and, as shown in Fig. 1, the palate portion 160 of the plate may be covered by a thin sheet of metal foil 17 which extends partially into the bases of the artificial teeth. A glazed sheet 18 is then placed upon the surface of the investment material in part 12 and the flask closed. Investment material 19 is then poured into the flask part 11 and allowed to set whereby an exact duplicate of the outer contour of the trial plate is made in the said investment material.

The next step in my technique is to remove the entire trial plate 13 including the teeth 16 from the investment material 19 in flask part 11 so that an impression 20 (Fig. 2) in the material is identical to the configuration of the lower major portion of the trial plate and teeth excluding the particular form of its stone engaging portion. To this end the wax base 15 is first removed by heating the flask part in any suitable manner, thus leaving the artificial teeth 16 embedded in the investment material 19, base side up. The teeth are separately removed from the material with a pair of tweezers which grips the base of each tooth and lifts it out of its impression leaving cavities in the investment material duplicating the teeth removed therefrom. At this point in the process any correction in contour of the final denture can be made by changing the configuration of the impression 20 or the cavities and it is to be particularly noted that all investment material left on the teeth impressions is removed so that a substantially wide and continuous recess 21 is made in the investment material wihch is in communication with the impression 20 to represent all adjacent teeth removed from the material. The surfaces of the teeth recess 21 are now coated with water glass or other impervious substances that are inert toward the plastic material for the dental appliance, whilst the foil protects the palate portion and exactly duplicates the fine markings in that portion.

An uncured, moldable denture material is prepared from a polymer and a monomer of a plastic substance such as a synthetic resin. This material is of a readily workable, doughlike consistency and has a white opaque color simulating the color of natural teeth. As indicated by reference numeral 22 in Fig. 3, a predetermined amount of this material is introduced into the recess 21 to just fill it. A sheet of glazed paper is now placed over the flask part and upon the mass of denture material 22 in the recess 21 and I then arrange upon this mass a resilient follower 23 which has the general form of, and is somewhat larger in proportion than the wax base 15 of the trial plate.

With particular reference to Figs. 3 and 8 there is shown a follower to be used in making an upper set of false teeth but it is to be understood that a follower having the form of the gum portion of a wax trial plate for a lower set of teeth could be used when my method is employed in making a lower denture in a two-part flask. The follower 23 is constructed from sponge rubber capable of withstanding a compressive force of about twenty-five pounds, said follower having a palatal portion 24, an arcuate gum portion 25 surrounding said palatal portion and a marginal upstanding flange 26. As illustrated in Fig. 3 the flask, with the teeth material 22 in the teeth recess 21, and the follower 23 placed in the impression 20 with its gum portion 25 closing the opening between the recess and the impression, is now closed so that the follower is compressed between the model or stone 14 and the impression 20 whereby the moldable plastic material 22 in the recess 21 is compressed and forced into all the teeth duplicating interstices in the recess.

This compression step is continued for a sufficient length of time to partially cure the moldable material and if necessary the flask may again be slightly heated to accelerate the partial curing step and thereby reduce the time required for the step. The flask is now opened and the follower and glazed paper lifted out of the flask part. Any excess of plastic material outside of the recess may now be removed or if an insufficient amount of material was initially placed therein, additional material added and a further compression step instituted. The moldable teeth material in partially cured condition is now removed from the recess and as it has a rubberlike consistency it is removed in one piece from the recess 21 so that all excess of material, such as that indicated by the numeral 240 in Fig. 4, may be cut from the body and the entire gum line of the teeth accurately formed by merely trimming its edges with a cutting implement such as a pair of scissors or a sharp knife.

As shown in Fig. 5 the partially cured and accurately formed teeth are now returned to the recess 21 and the impression 20 filled with an opaque, synthetic resin having a dough-like consistency and provided with a pink color simulating the color of the human gums which is to form the base for the finished denture. The flask part 12 with the model 14 invested therein is now placed upon part 11, as indicated in Fig. 5, and the closed flask subjected to heat and pressure until the plastic materials in the recess and in the impression are completely united and cured.

The denture appliance formed by my technique is illustrated in Fig. 6 which shows an artificial upper plate containing a full set of teeth. This denture is characterized by a distinct line of demarcation between the pink colored simulated gums 27 and the white teeth 28 due principally to the fact that in my method the teeth were in partially cured condition before the uncured plastic gum material was introduced into the flask and that during the final curing step when the flask is placed under heat and pressure the uncured gum material being relatively less dense than the partially cured teeth material does not displace the teeth material and further said gum material being lighter will readily flow into the spaces around the teeth material at the gum line thereof under the initial heat and pressure of the final curing step. Further, as illustrated in Fig. 7, adjacent teeth in the denture have relatively wide connecting webs 29 between them which unite the teeth and are themselves united to the gum at their bases to re-enforce the teeth and their connection with the base of the denture. It will also be apparent that the denture is free of deep cavities or openings in which food might become lodged to cause any odoriferous and unsanitary condition in the teeth during use.

What is claimed is:

1. The herein described method of forming an all-plastic, one-piece denture in a two-part dental flask said method comprising first forming a denture model having a base with the proper teeth secured to the base, investing the denture model in the investment material in one flask part, removing the base and the teeth of the denture model from the said flask part to provide respectively, in the investment material of said flask, a denture base impression and a teeth recess that opens into the impression, then inserting in the recess a predetermined quantity of uncured plastic material, placing a resilient follower upon said material in the recess, applying the other flask part and partially curing said material by applying pressure to the assembled flask, then separating the flask parts, removing the partially cured teeth from the recess and trimming the gum line therefor, returning said teeth to the recess, inserting uncured plastic material in the base impression in contact with the partially cured material in the recess, applying the other flask part, and curing the contents of the assembled flask parts by the application of heat and pressure.

2. The herein described method of forming an all-plastic, one-piece denture in a two-part dental flask said method comprising first forming a denture model having a base with the proper teeth secured to the base, investing the denture model in the investment material in one flask part, removing the base and the teeth of the denture model from the said flask part to provide respectively, in the investment material of said flask, a denture base impression and a teeth recess that opens into the impression, then inserting in the recess a predetermined quantity of uncured plastic material, placing a resilient follower upon said material in the recess, applying the other flask part and partially curing said material by applying pressure to the assembled flask, then separating the flask parts, removing the partially cured teeth from the recess and trimming the gum line therefor, returning said teeth to the recess, inserting uncured plastic material in the base impression in contact with the partially cured material in the recess, applying the other flask part, and curing the contents of the assembled flask parts by the application of heat and pressure.

3. The herein described method of forming an all-plastic, one-piece denture in a two-part dental flask said method comprising first forming a denture model having a base with the proper teeth secured to the base, investing the denture model in the investment material in one flask part, removing the base and the teeth of the denture model from the said flask part to provide respectively, in the investment material of said flask, a denture base impression and a continuous recess that opens into the impression and is a replica of adjacently disposed teeth in the model, then inserting in the recess a predetermined quantity of uncured plastic teeth forming material, partially curing said plastic material in the recess by application of pressure, removing said partially cured plastic teeth forming material from the recess and finally forming the gum line edge therefor, returning the finally formed material to the recess, inserting uncured plastic gum forming material in the base impression in contact with the partially cured teeth forming material in the recess, applying the other flask part, and curing the contents of the assembled flask parts by the application of heat and pressure.

4. The herein described method of forming an all-plastic, one-piece denture in a two-part dental flask said method comprising first forming a denture model having a base with the proper teeth secured to the base, investing the denture model in the investment material in one flask part, removing the base and the teeth of the denture model from the said flask part to provide respectively, in the investment material of said flask, a denture base impression and a continuous recess that opens into the impression and is a replica of adjacently disposed teeth in the model, then inserting in the recess a predetermined quantity of uncured plastic teeth forming material, placing a slightly oversize, resilient follower in the denture base impression, partially curing said plastic material in the recess by application of pressure on the follower, then inserting uncured plastic gum forming material in the base impression in contact with the partially cured teeth forming material in the recess, applying the other flask part, and curing the contents of the assembled flask parts by the application of heat and pressure.

ALBERT G. LEICHT.

References Cited in the file of this patent

UNITED STATES PATENTS

| Number | Name | Date |
|---|---|---|
| 200,445 | Fahnestock et al. | Feb. 19, 1878 |
| 731,367 | Huber | June 17, 1903 |
| 1,308,330 | Brown | July 1, 1919 |
| 2,057,341 | Morgan | Oct. 13, 1936 |
| 2,133,445 | Guerin | Oct. 18, 1938 |
| 2,192,902 | Erdle | Mar. 12, 1940 |
| 2,245,849 | Ballard | June 17, 1941 |
| 2,279,067 | Shapiro | Apr. 7, 1942 |
| 2,358,730 | Nelson et al. | Sept. 19, 1944 |
| 2,477,268 | Saffir | July 26, 1949 |
| 2,491,147 | Zahn | Dec. 13, 1949 |
| 2,542,207 | Osborne | Feb. 20, 1951 |